United States Patent [19]
Van Kleeck et al.

[11] Patent Number: 5,890,122
[45] Date of Patent: Mar. 30, 1999

[54] VOICE-CONTROLLED COMPUTER SIMULATEOUSLY DISPLAYING APPLICATION MENU AND LIST OF AVAILABLE COMMANDS

[75] Inventors: Michael Hinkley Van Kleeck, Duvall; Shannon Scott Hysom, Mercer Island, both of Wash.

[73] Assignee: Microsoft Corporation, Redmond, Wash.

[21] Appl. No.: 14,706

[22] Filed: Feb. 8, 1993

[51] Int. Cl.$^6$ .................................................. G10L 9/06
[52] U.S. Cl. ................................... 704/275; 704/235
[58] Field of Search .......................... 381/43, 44, 48; 395/2.4, 2.44, 2.6, 2.84; 704/231, 235, 251, 275

[56] References Cited

U.S. PATENT DOCUMENTS

| | | | |
|---|---|---|---|
| 4,509,133 | 4/1985 | Monbaron et al. | 704/251 |
| 4,556,954 | 12/1985 | Advani et al. | 707/500 |
| 4,677,569 | 6/1987 | Nakano et al. | 704/275 |
| 4,704,696 | 11/1987 | Reimer et al. | 704/275 |
| 4,766,529 | 8/1988 | Nakano et al. | 704/275 |
| 4,776,016 | 10/1988 | Hansen | 704/275 |
| 4,821,211 | 4/1989 | Torres | 345/357 |
| 4,827,520 | 5/1989 | Zeinstra | 701/1 |
| 4,931,950 | 6/1990 | Isle et al. | 706/11 |
| 4,959,864 | 9/1990 | Van Nes et al. | 704/251 |
| 5,157,384 | 10/1992 | Greonias et al. | 704/156 |
| 5,357,596 | 10/1994 | Takebayashi et al. | 704/275 |
| 5,377,303 | 12/1994 | Firman | 704/275 |
| 5,384,892 | 1/1995 | Strong | 704/243 |
| 5,386,494 | 1/1995 | White | 704/275 |
| 5,390,279 | 2/1995 | Strong | 704/200 |

OTHER PUBLICATIONS

Schmandt et al, "Augmenting a Window System with Speech Input", IEEE Computer vol. 23 NO. 8 Aug. 1990, p 50–56.

IBM Technical Disclosure vol. 33 No. 11 Apr. 1991 "Intergrated Audio–Graphics Interface" p. 368–371 Articulate Systems Inc., Voice Navigators Owner's Guide 1990 pp. 4,11–12, 25–27, 43–44.

Articulate Systems Inc., "Voice Navigator Owner's Guide", 1990, pp. 4,11,12,25,26,27,43 & 44.

*Primary Examiner*—David R. Hudspeth
*Assistant Examiner*—Tālivaldis Ivars Šmits
*Attorney, Agent, or Firm*—Seed & Barry LLP

[57] ABSTRACT

A method and system in a computer system for communicating instructions to an application program in response to spoken commands received by a spoken command input facility is provided. In a preferred embodiment of the present invention, a list of available commands is displayed under the control of the spoken command input facility. Each available command has an instruction associated with it that causes the application program to take some action. The spoken command input facility then determines whether a command spoken by a user is an available command. The spoken command input facility then communicates the instruction associated with the determined available command to the application program. If the spoken command is an available command, the spoken command input facility then revises the displayed list of available commands.

28 Claims, 10 Drawing Sheets

VOICE-CONTROLLED COMPUTER SIMULATEOUSLY DISPLAYING APPLICATION MENU AND LIST OF AVAILABLE COMMANDS

TECHNICAL FIELD

The invention relates generally to a method and system for selectively executing computer instructions, and, more specifically, to a method and system for executing computer instructions in response to spoken commands.

BACKGROUND OF THE INVENTION

Some computer programs, called application programs (applications), are designed to help users perform a certain type of work. An example of an application is an index card program, which helps users store and retrieve small volumes of textual information. The index card program maintains an electronic version of an index card file.

A user interacts with an application by inputting commands and data to the computer, which are received by the application. An example of commands that might be available in an index card program are add card and delete card, which a user might input in order to add or delete an index card. To add an index card to the file, a user would choose the add card command and input the text that is to be stored on an index card.

A user typically inputs a command by making a series of choices. These choices are often arranged in a command hierarchy. The command hierarchy represents all of the combinations of choices that a user can make in order to input a command. The application moves through, or "traverses," the command hierarchy in response to the user's choices. When the application reaches the bottom of the command hierarchy, the user has inputted a complete command. The application then executes a set of instructions that is associated with that command.

Figure 1:
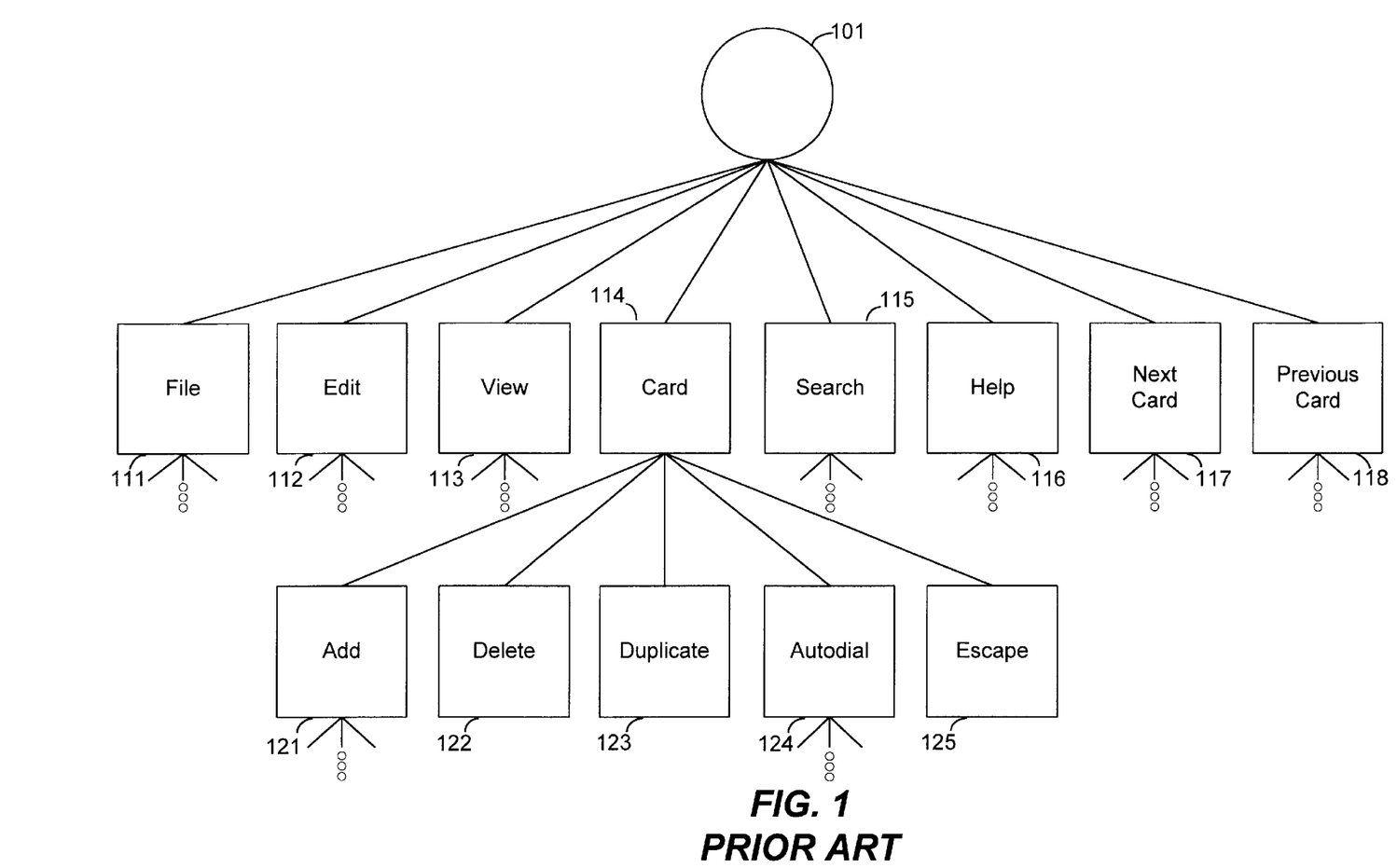
FIG. 1 is a diagram of the command hierarchy for the index card program.

FIG. 1 is a diagram of the command hierarchy for the index card program. The command hierarchy has a root node 101, first-level nodes 111–118, and second level nodes 121–125. The first-level nodes are said to be child nodes of the root node, and the second-level nodes are said to be child nodes of a first-level node. When traversing the command hierarchy, the application begins at the root node. By making a choice, the user may move the application to any child of the root node, like the card node 114. From the first-level node, the user continues to move the application to successive children until the application reaches a node without any children, such as the delete node 122 or the duplicate node 123. At this point, the user has inputted a complete command, which the application will execute. For example, by moving the application first to the card node and then to the duplicate node, the user can input the duplicate card command.

Figure 2A:
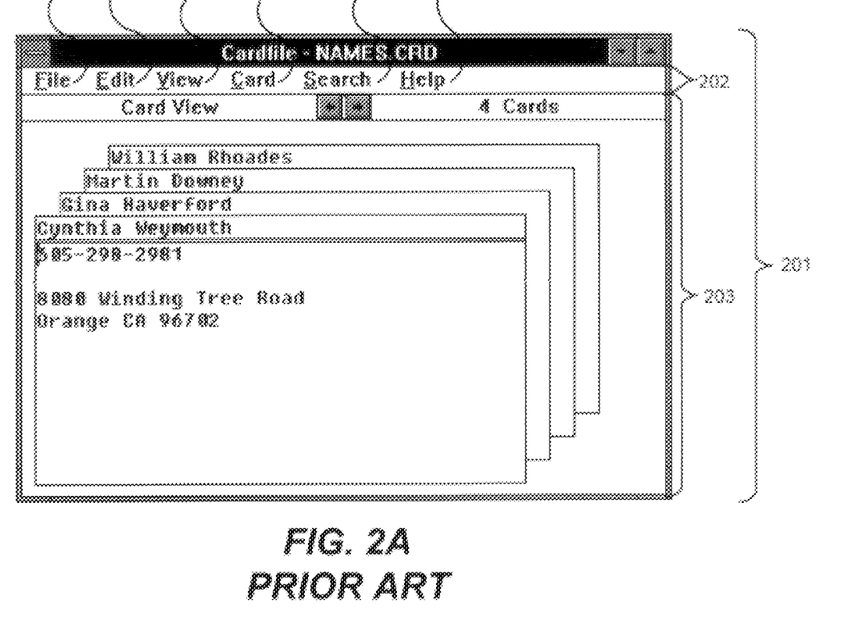
FIG. 2A is a display image of the visual interface presented by the index card program when the user is at the root node of the command hierarchy.
Figure 2B:
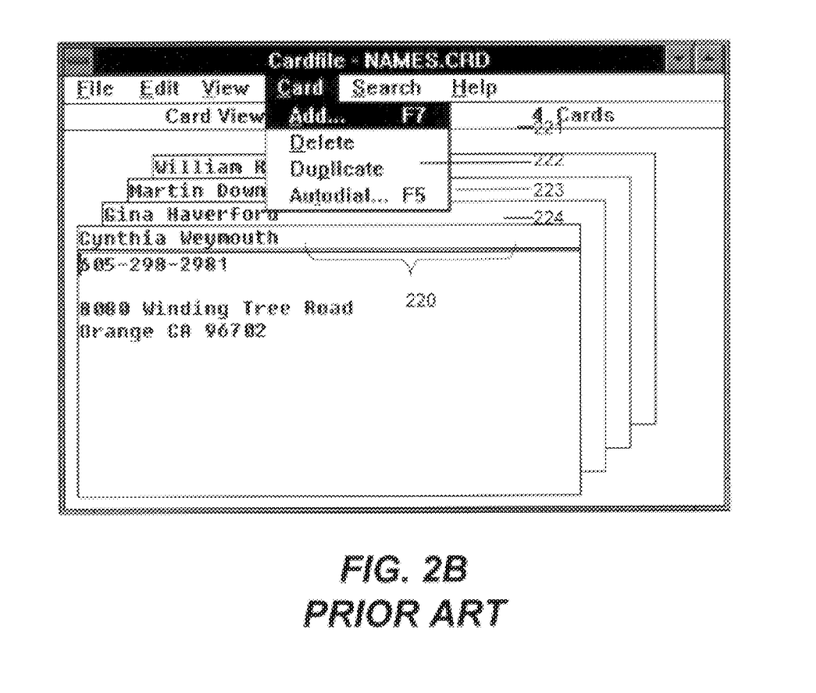
FIG. 2B is a display image of the visual interface presented by the index card program after the user has chosen the card menu bar item.
Figure 2C:
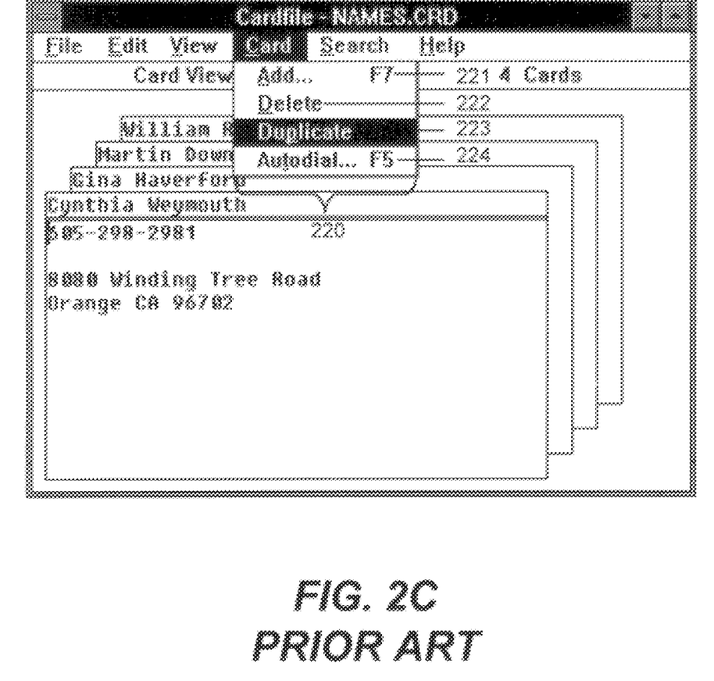
FIG. 2C is a display image of the visual interface presented by the index card program as the user is selecting the duplicate drop-down menu item.

Applications often present command hierarchies visually as drop-down menu structures. FIGS. 2A–2C are display images of the visual interface presented by the index card program. FIG. 2A is a display image of the visual interface presented by the index card program when the user is at the root node of the command hierarchy. The application's visual interface is presented in an application window 201. The application window contains a menu bar 202 and a client area 203. The menu bar in turn contains menu bar items 211–216. Each of the menu bar items corresponds to a first-level node in the command hierarchy. At this point, the user can either input data in the client area or choose a menu bar item.

If the user chooses a menu bar entry, the application moves to the corresponding first-level node in the command hierarchy. FIG. 2B is a display image of the visual interface presented by the index card program after the user has chosen the card menu bar item. The card menu bar item is highlighted, and a drop-down menu 220 is displayed beneath it. The drop-down menu contains drop-down menu items 221–224. These correspond to second-level nodes 121–124. At this point, the user can choose a drop-down menu item.

When the user chooses a drop-down menu item, the application moves to the corresponding second-level node in the command hierarchy. FIG. 2c is a display image of the visual interface presented by the index card program as the user is selecting the duplicate drop-down menu item. If that node has no children, then the user has inputted a complete command, and the application executes it. In FIGS. 2A–2C, the user has inputted the duplicate card command, and the application will duplicate an address card.

Figure 3:
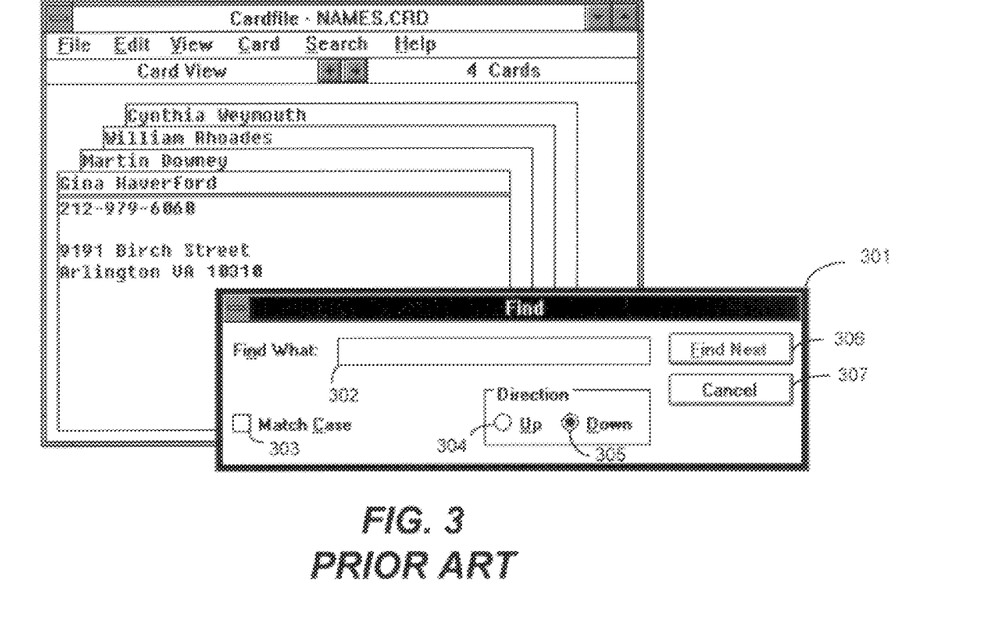
FIG. 3 is a screen image showing a dialog box for finding a card that contains certain text.

The application may also display choices in other screen objects besides menu bars and pull down menus, such as dialog boxes. A dialog box is a region of the screen containing a free-form arrangement of choice controls. FIG. 3 is a screen image showing a dialog box for finding a card that contains certain text. The Find dialog box 301 contains text box 302, check box 303, option buttons 304 and 305, and command buttons 306 and 307. Each dialog box control corresponds to a choice a user can make.

Figure 4:
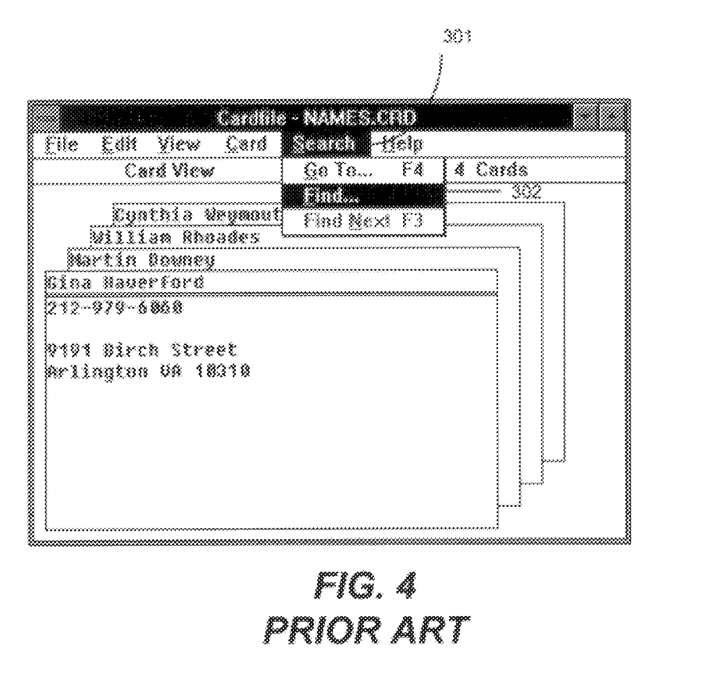
FIG. 4 is a screen image that shows how a user would reach the find dialog box.

A user usually reaches a dialog box by selecting a pull-down menu item that ends in an ellipsis. FIG. 4 is a screen image that shows how a user would reach the find dialog box. The user has chosen the search menu bar item 401. The user proceeds to choose the find . . . pull-down menu item 402. This causes the display of the Find dialog box 301.

Some choices corresponding to nodes of an application's command hierarchy are not displayed in any screen object. Examples include the next card node 117, the previous card node 118, and the escape node 125. The user must read the application's documentation in order to find out, first, that these choices exist and second, how to make these choices.

Applications typically allow users to make the choices necessary to input a command by either typing or using a pointing device, such as a mouse. While both choice methods are useful, applications would be more convenient if a user could also make choices and otherwise input commands by speaking words.

A computer can "hear" and recognize spoken words using a voice recognition system. In a voice recognition system, a microphone converts an audio signal to an analog electrical signal. A digitizer then converts the analog electrical signal to a digital electrical signal. A voice recognition program compares the digital electrical signal to phonetic models for different words in order to discern which word the user has spoken.

Dedicated facilities are available that allow a user to make choices and otherwise input commands for applications by speaking words. These facilities use a voice recognition system, and act as a front-end to applications. The facilities receive recognized words from the voice recognition program, translate them into commands that the current application can understand, and submit those commands to the current application. Typically, these facilities depend upon the current application's prompts for valid commands to inform the user which words are valid to speak at a given time. That is, these facilities present no independent indication of which spoken words they will recognize at a given time.

This omission poses problems. First, while these facilities allow a user to input commands that do not appear in the drop-down menu structure by speaking them, there is no indication that these commands are available for voice input. Second, in order to choose menu items that are phonetically similar to other menu items, these systems sometimes require users to speak words different from those appearing in the menu item. Because there is no visual indication of these substitutions, the facilities require users to memorize the substitute words.

SUMMARY OF THE INVENTION

It is an object of the present invention to provide a method and system for executing computer instructions in response to spoken commands that displays each available command, that displays the actual words that a user can speak, that displays the status of spoken command processing, and that displays user feedback in conjunction with an icon.

This and further objects, which will become apparent as the invention is more fully described below, are obtained by an improved method and system for communicating instructions to an application program in response to spoken commands received by a spoken command input facility. In a preferred embodiment of the present invention, a list of available commands is displayed under the control of the spoken command input facility. Each available command has an instruction associated with it that causes the application program to take some action. The spoken command input facility then determines whether a command spoken by a user is an available command. The spoken command input facility then communicates the instruction associated with the determined available command to the application program. If the spoken command is an available command, the spoken command input facility then revises the displayed list of available commands.

DETAILED DESCRIPTION OF THE INVENTION

The present invention is an improved method and system for executing instructions in response to spoken commands. In a preferred embodiment of the present invention, a spoken command input facility (the facility) displays a list of active words, accepts a spoken active word from a user, invokes a voice recognition program to recognize the active word, and submits a choice associated with the recognized active word to an application. In order to work with the facility, the only requirement for applications is that they have some method of inputting choices. Applications need not be designed with the facility in mind.

Figure 5:
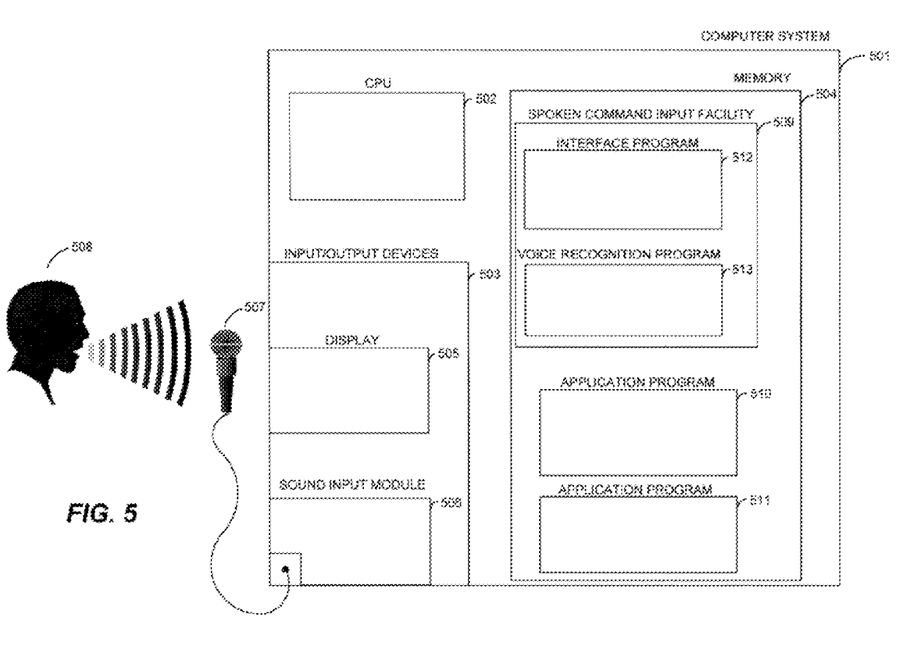
FIG. 5 is a diagram of the general-purpose computer system on which the facility preferably executes.

In a preferred embodiment, the facility is a pair of computer programs. FIG. 5 is a diagram of the general-purpose computer system on which the facility preferably executes. The general-purpose computer system 501 includes a central processing unit 502, input and output devices 503 and computer memory 504. The input and output devices include a display 505 and a sound input hardware module (sound input module) 506. The sound input module includes a microphone 507, into which a user 508 can speak. The memory contains the spoken command input facility 509, and application programs 510 and 511. The spoken command input facility consists of two programs: a user and application interface program (interface program) 512 and a voice recognition program 513.

The user can activate the facility in conjunction with an application program. If the user or facility designer has provided the facility with information about that application program's command hierarchy, then the facility can receive the user's spoken choices and communicate them to the application in a form that the application understands. Because the facility communicates the choices to the application in a form that the application understands, the application need not be designed or adapted to receive choices specifically from the facility.

Figure 6A:
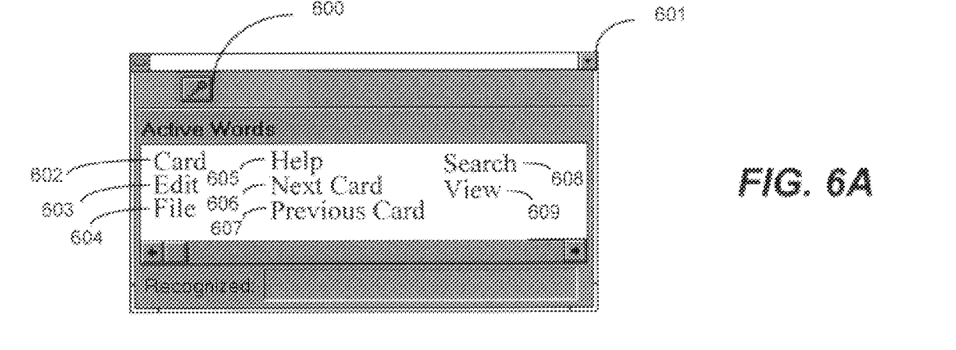
FIGS. 6A–D are screen images of the active words window.

When the user activates the facility in conjunction with an application, the interface program displays in an active words window a list of active words that the user may speak in order to input currently appropriate choices. Active words are also referred to as available commands, and the active words window is also referred to as a command window. FIG. 6A is a screen image of the active words window. Active words window 601 contains an enable/disable button 600 and active words 602–609. Each active word corresponds to a currently appropriate choice. The interface program can cause the application to act on the choice that corresponds to a given word by submitting a series of commands corresponding to keystrokes to the application. Such a series of keystroke commands is stored with each active word. In another embodiment, the interface program stores and submits user choices in a different form, such as mouse events. The enable/disable button alternately enables and disables the facility when the user "presses" it by using the mouse to position the mouse cursor inside the button and pressing the mouse button. The facility is enabled when the button appears to be depressed, and is disabled when the button is undepressed. In FIG. 6A, the button is undepressed.

When the user speaks a word into the microphone, the interface program receives a digitized representation of the spoken word from the sound input module. The interface program then invokes the voice recognition program to recognize the spoken word as one of the active words. The interface program passes the voice recognition program a pointer to the digitized representation of the spoken word. If the voice recognition program recognizes the spoken word as one of the active words, it returns an indication of which active word it recognized the spoken word as. The interface program then communicates the choice associated with the recognized word to the application program. In a preferred embodiment, the interface program accomplishes this by submitting keystroke commands corresponding to the choice associated with the recognized word to the application program. When the application receives these keystrokes, it acts upon the choice to which the keystrokes correspond. The interface program then updates the list of active words in light of the new currently appropriate choices and waits for the user to speak another word.

Figure 7:
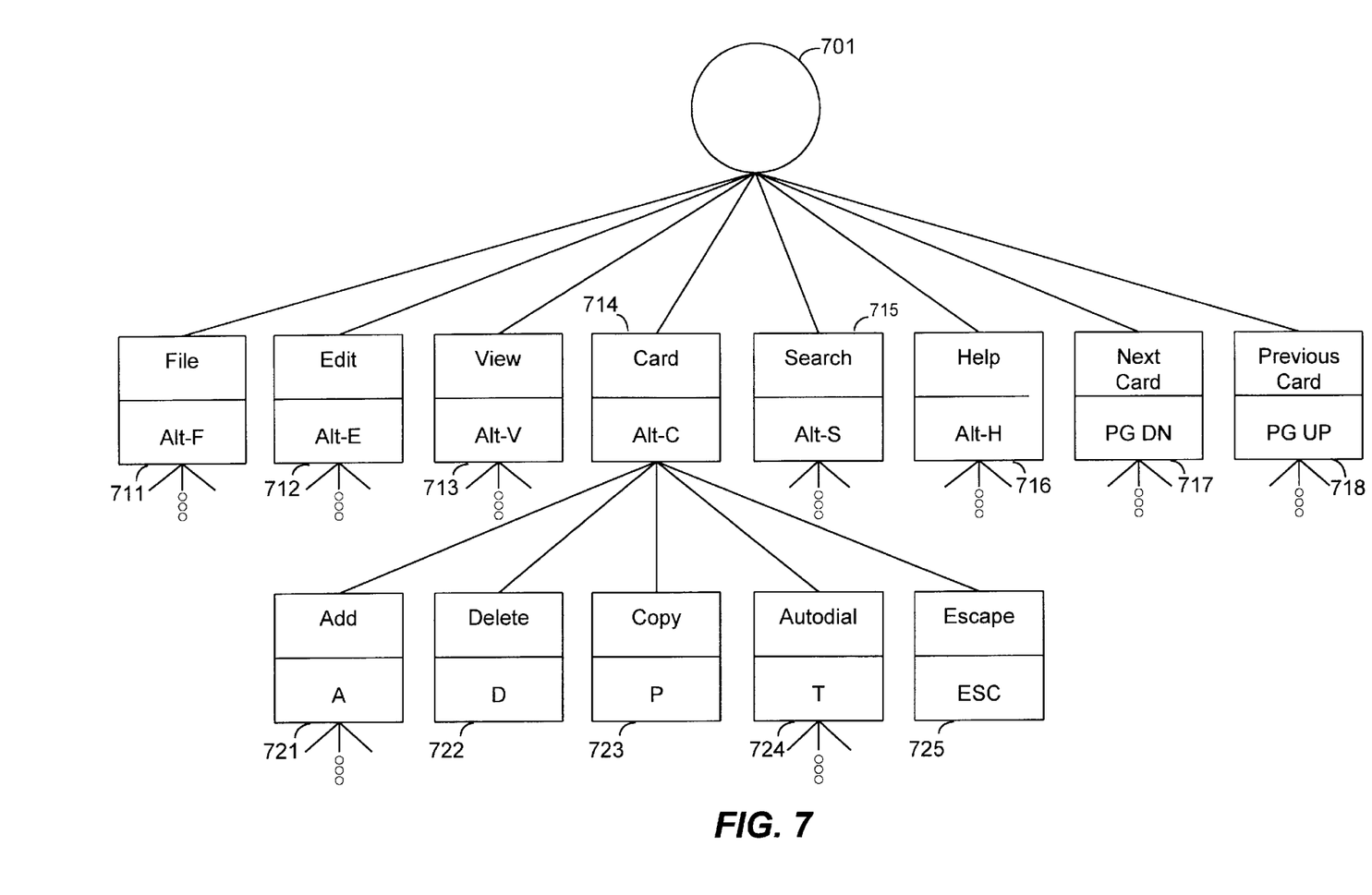
FIG. 7 is a diagram of the active words hierarchy for the index card program.

The facility can work in conjunction with several different applications which reside in computer memory. The facility has a spoken words hierarchy for each application. A spoken words hierarchy is similar to an application's command hierarchy. In fact, each application's spoken word hierarchy is modeled after that application's command hierarchy. The facility traverses a spoken words hierarchy in the same way an application traverses a command hierarchy. FIG. 7 is a diagram of the spoken words hierarchy for the index card program. It has a root node 701, first-level nodes 711–718, and second-level nodes 721–725. Each node has two components: a word, and a sequence of keystroke commands corresponding to the choice associated with the word. The active words at any given time correspond to the word components of the children of the active node.

Because the spoken word's hierarchy is modeled after the command hierarchy, the nodes in the spoken words hierarchy correspond closely to those in the command hierarchy. Many nodes of the spoken word hierarchy correspond exactly to nodes of the command hierarchy, having the same word components. However, when the word components of two sibling nodes (nodes having a common parent) of the command hierarchy are phonetically similar, the word component of one of the corresponding nodes of the spoken word hierarchy is preferably altered to make the word components of those siblings more phonetically distinct. An example is the copy node 723 of the spoken word hierarchy, which corresponds to the duplicate node of the command hierarchy. The word component is changed to avoid phonetic confusion with the delete node 722.

Figure 8A:
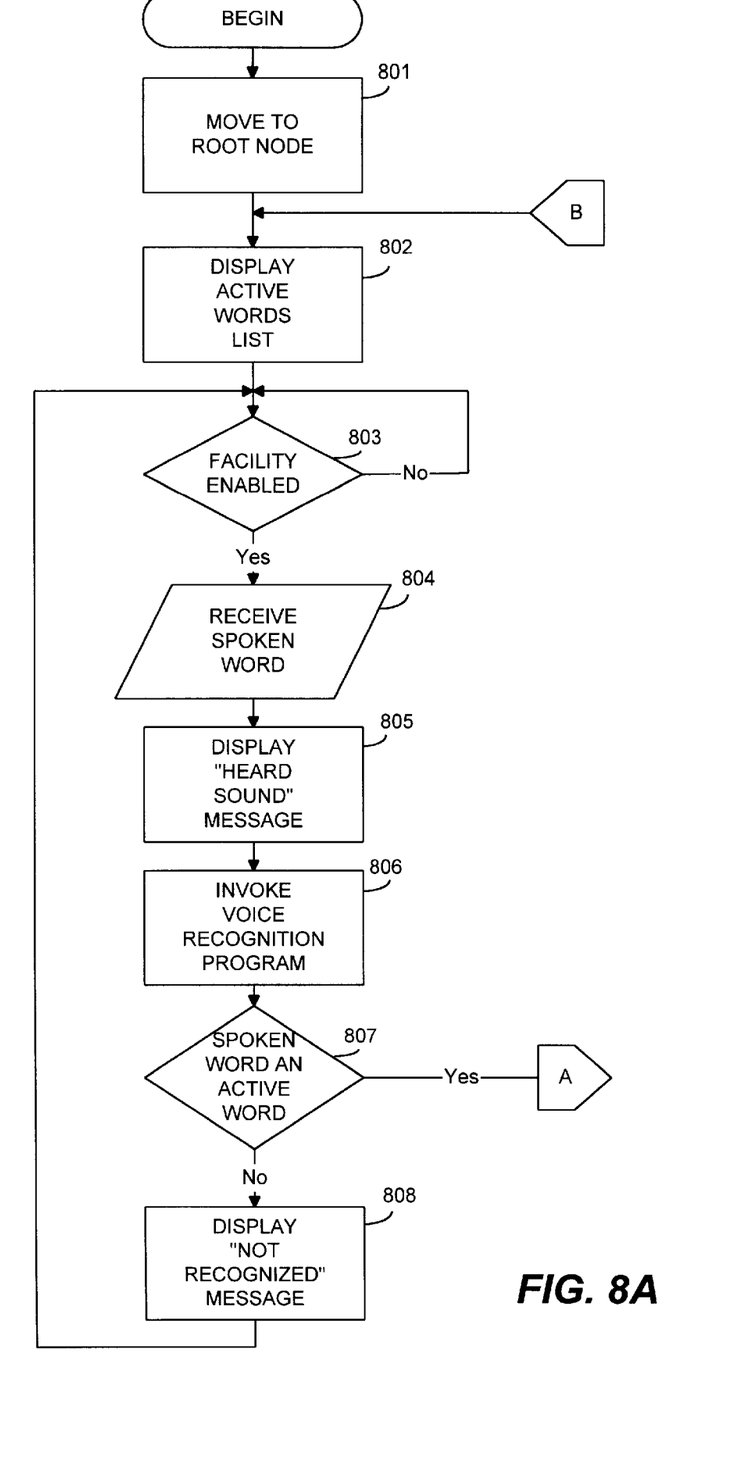
FIGS. 8A–B are a flow diagram of the spoken command input facility.
Figure 8B:
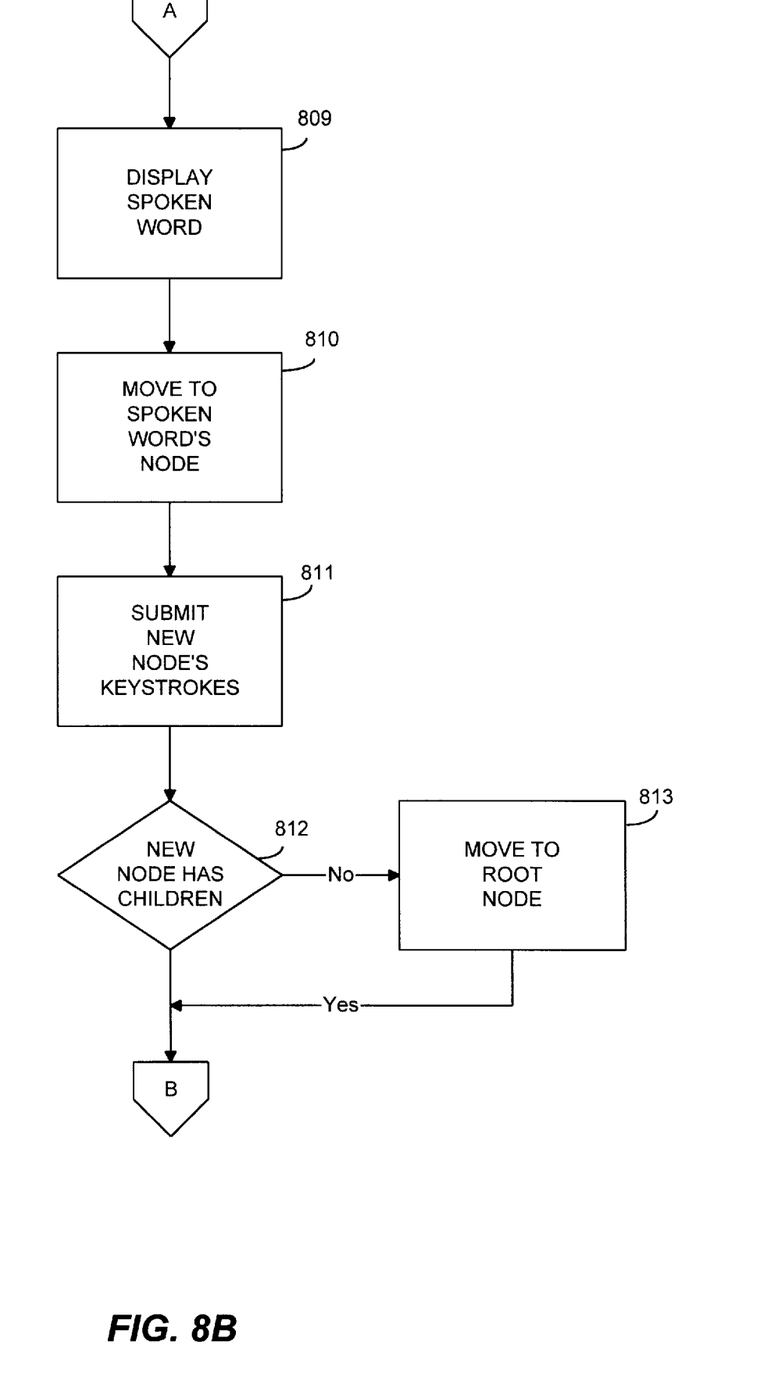

FIGS. 8A–B are a flow diagram of the interface program. In step 801, the interface program moves to the root node of the spoken word hierarchy. In step 802, the interface program displays the word component of each first-level node as the list of active words. They appear as active words 602–609. Each word in the active words list corresponds to a first-level node in FIG. 7.

Figure 6B:
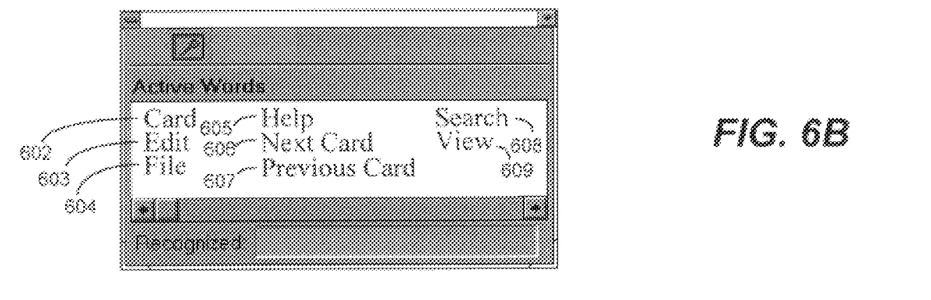

In step 803, if the user has enabled the interface program by pressing the enable/disable button 608 then the interface program continues at step 804 else the interface program continues at step 803. FIG. 6B is a screen image of the active words window after the user has enabled the interface program. When the user speaks a word, the interface program receives the spoken word in step 804.

Figure 6C:
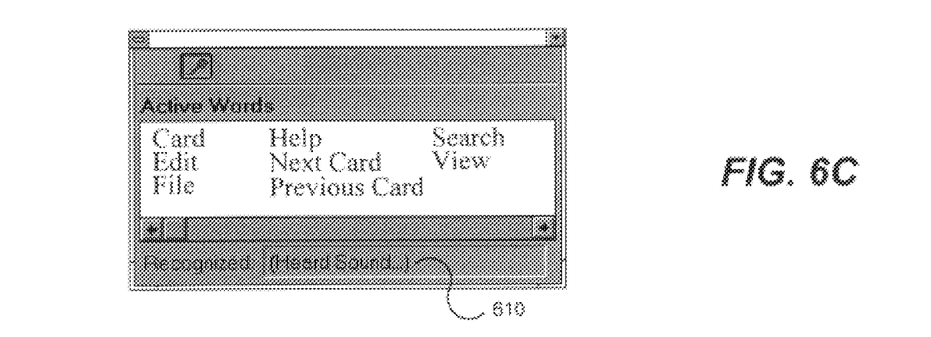

In step 805, the interface program displays a message indicating that it received the spoken word. FIG. 6C is a screen image of the active words window immediately after the interface program has executed step 805. The active words window contains a "heard sound" message 610, indicating that the interface program has received the spoken word.

In step 806, the interface program invokes the voice recognition program to see whether the spoken word is an active word. In step 807, if the voice recognition program recognizes the spoken word as an active word with at least a threshold level of certainty, then the interface program continues through junction A at step 809 to process the spoken word, else the interface program displays a "spoken word not recognized" message in step 808 and continues at step 803. The "spoken word not recognized" message replaces the "heard sound" message at the bottom of the active words window.

Figure 6D:
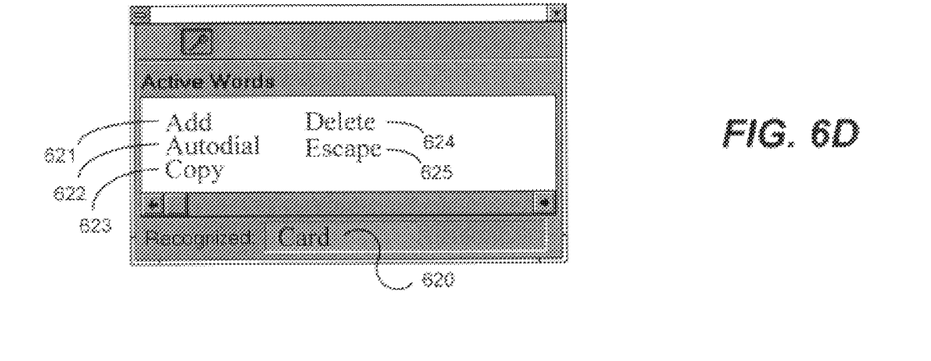

In step 809, the interface program displays the spoken word. FIG. 6D is a screen image of the active words window immediately after the interface program has executed step 808. The active words window contains the spoken word 620, indicating that the interface program has recognized the spoken word.

In step 810, the interface program moves from the current node to the child node whose word component contains the current spoken word. In step 811, the interface program submits the keystroke commands contained in the new node's keystroke component to the application. In step 812, if the new node has child nodes, then the interface program continues through junction B at step 803. If the new node has no child nodes, the interface program moves to the root node in step 813, and continues through junction B at step 803.

As an example, by speaking the word "card", the user would cause the interface program to move to the card node 714 and submit the keystroke Alt-C. The keystroke causes the application to move to the corresponding card node 114 in the command hierarchy. If the voice recognition fails to recognize the spoken word with the threshold of certainty, the interface program displays a message to that effect and remains at the same node. Since the interface program does not submit any keystrokes to the application when the word is not recognized, the application also remains at the same node.

After the interface program moves to the card node it displays the word component of each of the children of the new node as the list of active words. The interface program further displays the word just recognized. FIG. 6D is a display image of the active words window after the user has spoken and the voice recognition program has recognized the word "card". The active words window 601 contains new active words 621–625 and recognized word 620.

The user can then speak another word, which the interface program compares to the revised list of active words. If the new spoken word is among the revised list of active words, the interface program moves to the child whose word component contains the spoken word and submits the keystroke commands contained in its keystroke component to the application. By speaking the word "copy", the user would cause the interface program to move to the copy node 723 and submit the keystroke command P. The keystroke command causes the application to move to the corresponding duplicate node 123 in the command hierarchy. This continues until the interface program submits the keystroke commands of a node without children. At this point, the user has inputted a complete command, and the interface program preferably returns to the root node of the spoken words hierarchy. The application should also be at the root of the command hierarchy at this time, having received and processed an entire command. If the user has spoken the words "card" and "copy," the application should have processed the duplicate card command, making a copy of the topmost index card, and returned to the root of the command hierarchy. At the root, the application is ready to receive another command.

Figure 9A:
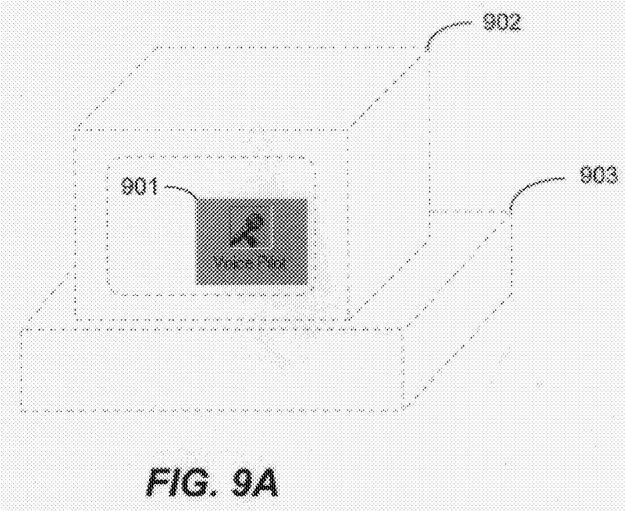
FIGS. 9A–D are screen images of the icons displayed by the command input facility.
Figure 9B:
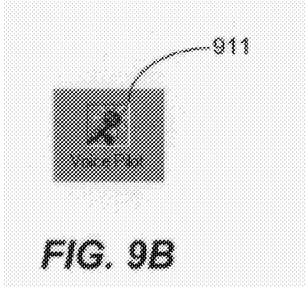
Figure 9C:
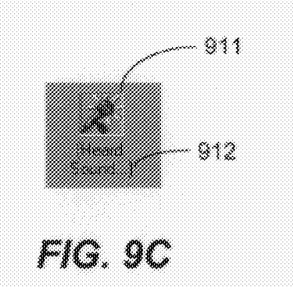
Figure 9D:
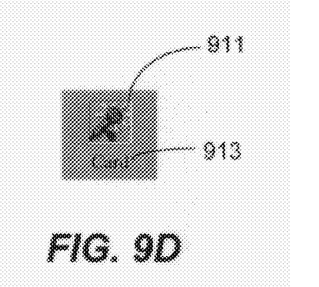

In another embodiment, the interface program uses icons for its visual user interface. FIGS. 9A–D are screen images of the icons displayed by the interface program. FIG. 9A is a screen image of the disabled icon. A disabled icon 901 is displayed on a display device 902, which is connected to a computer 903. The interface program displays the disabled icon when the user has disabled the interface program. The icons in FIGS. 9B–D are likewise designed to be displayed on a display device connected to a computer.

FIG. 9B is a screen image of the enabled icon. The interface program displays an enabled icon 911 when the user has enabled the interface program.

FIG. 9C is a display image of the enabled icon after the user has spoken a word. The interface program displays the "heard sound" message 912 in step 805, indicating that the interface program has received the spoken word, in conjunction with the enabled icon 911.

FIG. 9D is a screen image of the enabled icon after the interface program has recognized the spoken word as an active word. The interface program displays the spoken word 913 in step 808 in conjunction with the enabled icon 911. The use of icons for the interface program's user interface allows the interface program to convey nearly the same amount of information as it can convey in an active words window in a fraction of the display space. This user interface approach does not permit the display of the active words, however.

It may be possible for the interface program to fall out of synchronization with the application. This means that the interface program is at a spoken words node that does not correspond to the command node occupied by the application. This usually happens when the user uses the keyboard or the mouse to traverse the command hierarchy without correspondingly traversing the spoken words hierarchy. When the interface program is at the wrong spoken words node, it displays and recognizes from an incorrect active words list. To correct the situation, the user can return the interface program to the root node by either switching the interface program off then on again, or by speaking a special dummy word designed to return the interface program to the root node without issuing any keystrokes to the application.

While this invention has been shown and described with reference to preferred embodiments, it will be understood by those skilled in the art that various changes or modifications in form and detail may be made without departing from the spirit and scope of this invention. For example, the facility could submit choices to an application by sending messages to or calling either the application or the operating system. Also, instead of listing active words visually in a window on the display, the facility could invoke a voice synthesizer to list the active words verbally. Further, infrequently used commands could be omitted from the spoken word hierarchy in order to expedite word recognition or conserve memory.

We claim:

1. A method in a computer system for indicating to a user a list of available voice commands that are currently recognizable by the computer system, the computer system having an application program that performs tasks in response to receiving instructions to perform the tasks, the method comprising:

providing a plurality of lists of available voice commands, each voice command in a list being associated with an instruction for a task and being associated with an indication of a list of available voice commands to display next;

displaying menu items of a menu of the application program;

displaying, separately from the displayed menu items, one of the lists of available voice commands, the displayed list having an available voice command that corresponds to a displayed menu item and having an available voice command that does not correspond to a displayed menu item so that available voice commands other than those corresponding to the displayed menu items are displayed;

while displaying the menu items and one of the lists of available voice commands, receiving speech corresponding to one of the displayed available voice commands; and in response to receiving the speech, sending the instruction associated with the available voice command corresponding to the received speech to the application program so that the application program performs a task in response to receiving the sent instruction; and displaying the list of available voice commands indicated to be displayed next that is associated with the available voice command corresponding to the received speech whereby the menu items of the menu of the application program and the list of available voice commands are displayed simultaneously.

2. The method of claim 1 wherein an available voice command that corresponds to a menu item is a different word from the menu item.

3. The method of claim 1 including providing a visual indication that the received speech has been recognized as one of the available voice commands in the displayed list of available voice commands.

4. A method in a computer system for executing instructions in response to spoken commands, the method comprising:

displaying currently available menu items;

displaying, separately from the displayed menu items, a list of available voice commands so that the currently available menu items and the list of available voice commands are displayed simultaneously, an instruction being associated with each available voice command;

while the currently available menu items and the list of available voice commands are displayed, receiving speech spoken by a user;

determining whether the received speech corresponds to an available voice command; and when it is determined that the received speech corresponds to an available voice command, executing the instruction associated with the determined available voice command; and revising the displayed list of available voice commands to reflect those commands that are available after execution of the instruction associated with the available voice command corresponding to the received speech.

5. The method of claim 4 wherein the determining includes subjecting the spoken command to a voice recognition process that indicates that the spoken command is an available voice command when recognized.

6. The method of claim 4, further including indicating that a command has been spoken.

7. The method of claim 4, further including, when the spoken command is determined to be an available voice command, indicating that the spoken voice command is an available voice command.

8. The method of claim 7 wherein the indicating that the spoken command is an available voice command displays the determined available voice command.

9. The method of claim 4, further including, when the spoken command is determined to not be an available voice command, indicating that the spoken command is not an available voice command.

10. In a computer system having an application program capable of performing a task, a method for performing the task under the control of the application program in response to receiving voice data, the method comprising:

under the control of the application program,
- displaying in an application program window one or more menus each comprised of menu items corresponding to a task of the application program;

under the control of a voice input facility that is separate from the application program,
- displaying a plurality of available voice commands in a voice input facility window, one of the voice commands being associated with a menu item such that the available voice commands and the one or more menus are displayed simultaneously;
- while the one or more menus are displayed simultaneously with the plurality of available voice commands, receiving voice data;
- recognizing the voice data as a voice command among the displayed plurality of available voice commands;
- submitting a request to the application program to perform the task of the menu item associated with the voice command;

under the control of the application program,
- in response to the request, performing the functionality of the menu item associated with the voice command; and under the control of the voice input facility,
- revising the plurality of available voice commands displayed in the voice input facility window to reflect voice commands available after the application program has begun performing the task.

11. An apparatus in a computer system for executing instructions in response to spoken commands, the apparatus comprising:
- means for displaying currently available menu items;
- means for displaying, simultaneously with the displayed menu item and in a command window separate from the menu items, a list of available voice commands, an instruction being associated with each available voice command;
- means for determining whether a spoken command is an available voice command, the spoken command being spoken while the currently available menu items and the list of available voice commands are displayed simultaneously;
- means for executing the instruction associated with the determined available voice command; and
- means for revising the list of available voice commands displayed in the command window to reflect those commands that are available after the instruction is executed.

12. The apparatus of claim 11 wherein the determining means subjects the spoken command to a voice recognition process that indicates that the spoken command is an available voice command when recognized.

13. The apparatus of claim 11, further including means for indicating that a command has been spoken.

14. The apparatus of claim 11, further including means for indicating that the spoken command is an available voice command when the spoken command is determined to be an available voice command.

15. The apparatus of claim 14 wherein the means for indicating that the spoken command is an available voice command displays the determined available voice command.

16. The apparatus of claim 11, further including means for indicating that the spoken command is not an available voice command when the spoken command is determined to not be an available voice command.

17. A computer-readable medium containing computer instructions for causing a computer system for executing instructions in response to spoken commands, the method comprising:
- displaying currently available menu items;
- displaying, separately from the displayed menu items, a list of available voice commands so that the currently available menu items and the list of available voice commands are displayed simultaneously, an instruction being associated with each available voice command;
- while the currently available menu items and the list of available voice commands are displayed simultaneously, receiving speech spoken by a user;
- determining whether the received speech corresponds to an available voice command; and
- when it is determined that the received speech corresponds to an available voice command, executing the instruction associated with the determined available voice command.

18. The computer-readable medium of claim 17 wherein the determining includes subjecting the spoken command to a voice recognition process that indicates that the spoken command is an available voice command wherein recognized.

19. The computer-readable medium of claim 17, further including indicating that a command has been spoken.

20. The computer-readable medium of claim 17, further including, when the spoken command is determined to be an available voice command, indicating that the spoken voice command is an available voice command.

21. The computer-readable medium of claim 20 wherein the indicating that the spoken command is an available voice command displays the determined available voice command.

22. The computer-readable medium of claim 17, further including, when the spoken command is determined to not be an available voice command, indicating that the spoken command is not an available voice command.

23. A method in a computer system for executing instructions in response to spoken commands, the method comprising the steps of:
- displaying currently available menu items;
- displaying, in a command window distinct from the menu items, a list of available commands, each available command having an instruction associated with it;
- determining whether a spoken command is an available command;
- executing the instruction associated with the determined available command; and
- revising the list of available commands displayed in the command window to reflect those commands that are available after execution of the instruction associated with the determined available command.

24. The method of claim 23 wherein the determining step includes subjecting the spoken command to a voice recognition process that indicates that the spoken command is an available command when recognized.

25. The method of claim 23, further including the step of indicating that a command has been spoken.

26. The method of claim 23, further including the step of, when the spoken command is determined to be an available command, indicating that the spoken command is an available command.

27. The method of claim 26 wherein the step of indicating that the spoken command is an available command displays the determined available command.

28. The method of claim 23, further including the step of, when the spoken command is determined to not be an available command, indicating that the spoken command is not an available command.

* * * * *